(12) United States Patent
Negrete et al.

(10) Patent No.: US 11,335,963 B2
(45) Date of Patent: May 17, 2022

(54) TRACTION BATTERY PACKS WITH SECOND TIER INTEGRATED SUPPORTING, THERMAL, AND SEALING STRUCTURES

(71) Applicant: FORD GLOBAL TECHNOLOGIES, LLC, Dearborn, MI (US)

(72) Inventors: Justin Eugene Negrete, Plymouth, MI (US); John Peter Bilezikjian, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 364 days.

(21) Appl. No.: 16/749,107

(22) Filed: Jan. 22, 2020

(65) Prior Publication Data
US 2021/0226274 A1 Jul. 22, 2021

(51) Int. Cl.
H01M 10/613 (2014.01)
H01M 10/6556 (2014.01)
B60L 58/26 (2019.01)
H01M 10/625 (2014.01)
H01M 50/20 (2021.01)

(52) U.S. Cl.
CPC .......... *H01M 10/613* (2015.04); *B60L 58/26* (2019.02); *H01M 10/625* (2015.04); *H01M 10/6556* (2015.04); *H01M 50/20* (2021.01); *H01M 2220/20* (2013.01)

(58) Field of Classification Search
CPC .. H01M 50/20; H01M 10/613; H01M 10/625; H01M 10/6554; H01M 10/6556; H01M 10/6568; H01M 2220/20; H01M 50/209; H01M 50/249; H01M 50/298; B60L 50/64; B60L 58/26; B60L 50/66; Y02E 60/10; Y02T 10/70
See application file for complete search history.

(56) References Cited

U.S. PATENT DOCUMENTS

| 4,290,444 | A | * | 9/1981 | Bevan | ................. | H01M 50/673 137/577 |
| 4,325,429 | A | * | 4/1982 | Bevan | ............... | H01M 10/6569 165/137 |
| 5,639,571 | A | * | 6/1997 | Waters | .................... | B60L 58/26 180/68.5 |
| 8,252,452 | B2 | | 8/2012 | Yoon et al. | | |
| 8,877,366 | B2 | | 11/2014 | Weber et al. | | |
| 10,224,584 | B2 | | 3/2019 | Moschet et al. | | |
| 10,283,824 | B2 | | 5/2019 | Moschet et al. | | |

(Continued)

FOREIGN PATENT DOCUMENTS

| CN | 102376916 A | * | 3/2012 | ......... | H01M 10/486 |
| CN | 208767437 U | | 4/2019 | | |

(Continued)

*Primary Examiner* — Kaity V Chandler
(74) *Attorney, Agent, or Firm* — David B. Kelley; Carlson, Gaskey & Olds, P.C.

(57) ABSTRACT

This disclosure details exemplary battery pack designs, such as those designed for use within electrified vehicles. Exemplary battery packs may include an enclosure assembly and a plurality of battery arrays housed inside the enclosure assembly. The enclosure assembly may include a mid-tray that is configured for supporting, cooling/heating, and sealing second tier battery arrays. The configuration of the mid-tray allows coolant joints to be eliminated inside of the battery pack.

19 Claims, 5 Drawing Sheets

(56) References Cited

U.S. PATENT DOCUMENTS

| | | | | |
|---|---|---|---|---|
| 2013/0323551 A1* | 12/2013 | Lee | ..................... | H01M 50/20 |
| | | | | 429/83 |
| 2016/0359206 A1 | 12/2016 | Eberleh et al. | | |
| 2018/0062228 A1* | 3/2018 | Wuensche | ......... | H01M 10/6556 |
| 2018/0337377 A1* | 11/2018 | Stephens | ................. | B60L 50/66 |
| 2020/0251698 A1* | 8/2020 | Paramasivam | ... | H01M 10/6568 |
| 2021/0143378 A1* | 5/2021 | Probert | .............. | H01M 10/625 |

FOREIGN PATENT DOCUMENTS

| | | | | |
|---|---|---|---|---|
| JP | 2000516390 A * | 12/2000 | ............ | H01M 50/20 |
| WO | WO-2016112067 A1 * | 7/2016 | ............ | B65D 19/02 |

* cited by examiner

TRACTION BATTERY PACKS WITH SECOND TIER INTEGRATED SUPPORTING, THERMAL, AND SEALING STRUCTURES

TECHNICAL FIELD

This disclosure relates to battery packs, and more particularly to integrated structures for supporting, cooling, and sealing second tier battery arrays of battery packs.

BACKGROUND

Electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage traction battery pack typically powers the electric machines and other electrical loads of the electrified vehicle. An enclosure assembly of the battery pack houses a plurality of battery internal components, including but not limited to, battery arrays that include battery cells. The battery cells release heat during charging and discharging operations and are typically thermally managed in order to improve their capacity and life span.

SUMMARY

A battery pack according to an exemplary aspect of the present disclosure includes, among other things, a tray, a first battery array positioned within the tray, a mid-tray received relative to the tray, a second battery array positioned within the mid-tray, and an internal cooling circuit disposed inside the mid-tray and configured to thermally manage the second battery array.

In a further non-limiting embodiment of the foregoing battery pack, the tray includes a peripheral flange, and the mid-tray is secured to the peripheral flange by a fastener.

In a further non-limiting embodiment of either of the foregoing battery packs, a seal is disposed between the peripheral flange and the mid-tray.

In a further non-limiting embodiment of any of the foregoing battery packs, a third battery array is spaced apart from the first battery array within the tray and a fourth battery array is spaced apart from the second battery array within the mid-tray.

In a further non-limiting embodiment of any of the foregoing battery packs, the mid-tray includes a floor and at least three side walls that protrude upwardly from the floor.

In a further non-limiting embodiment of any of the foregoing battery packs, the mid-tray includes an open side.

In a further non-limiting embodiment of any of the foregoing battery packs, the internal cooling circuit is inside the floor of the mid-tray.

In a further non-limiting embodiment of any of the foregoing battery packs, a thermal interface material (TIM) is disposed between the second battery array and the mid-tray.

In a further non-limiting embodiment of any of the foregoing battery packs, the internal cooling circuit includes a plurality of fluid passes arranged between an inlet port and an outlet port of the mid-tray.

In a further non-limiting embodiment of any of the foregoing battery packs, the plurality of fluid passes are arranged together to establish a serpentine path.

In a further non-limiting embodiment of any of the foregoing battery packs, the inlet port and the outlet port protrude outwardly from an external surface of a wall of the mid-tray.

In a further non-limiting embodiment of any of the foregoing battery packs, a cover is secured over both the tray and the mid-tray such at least a portion of both the tray and the mid-tray are exposed outside of the cover.

A battery pack according to another exemplary aspect of the present disclosure includes, among other things, a tray, a first tier of battery arrays supported by the tray, a mid-tray positioned over at least a portion of the first tier of battery arrays and secured to a peripheral flange of the tray, a second tier of battery arrays supported by the mid-tray, and a cover secured to both the peripheral flange of the tray and a sealing surface of the mid-tray.

In a further non-limiting embodiment of the foregoing battery pack, the mid-tray includes a floor and at least three side walls that protrude upwardly from the floor.

In a further non-limiting embodiment of either of the foregoing battery packs, an internal cooling circuit having a plurality of fluid passes disposed inside of the floor.

In a further non-limiting embodiment of any of the foregoing battery packs, a first seal is disposed between the peripheral flange and the mid-tray and a second seal is disposed between the cover and the peripheral flange and between the cover and the mid-tray.

In a further non-limiting embodiment of any of the foregoing battery packs, the mid-tray includes an inlet port and an outlet port that are both exposed outside of the battery pack.

In a further non-limiting embodiment of any of the foregoing battery packs, an internal cooling circuit of the mid-tray connects between the inlet port and the outlet port.

In a further non-limiting embodiment of any of the foregoing battery packs, the mid-tray is secured to the tray by a first plurality of fasteners and the cover is secured to both the tray and the mid-tray by a second plurality of fasteners.

In a further non-limiting embodiment of any of the foregoing battery packs, the battery pack excludes any internal coolant joints.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs, such as those designed for use within electrified vehicles. Exemplary battery packs may include an enclosure assembly and a plurality of battery arrays housed inside the enclosure assembly. The enclosure assembly may include a mid-tray that is configured as an integrated structure for supporting, cooling/heating, and sealing second tier battery arrays. The configuration of the mid-tray allows coolant joints to be eliminated inside of the battery pack. These and other features are discussed in greater detail in the following paragraphs of this detailed description.

Figure 1:
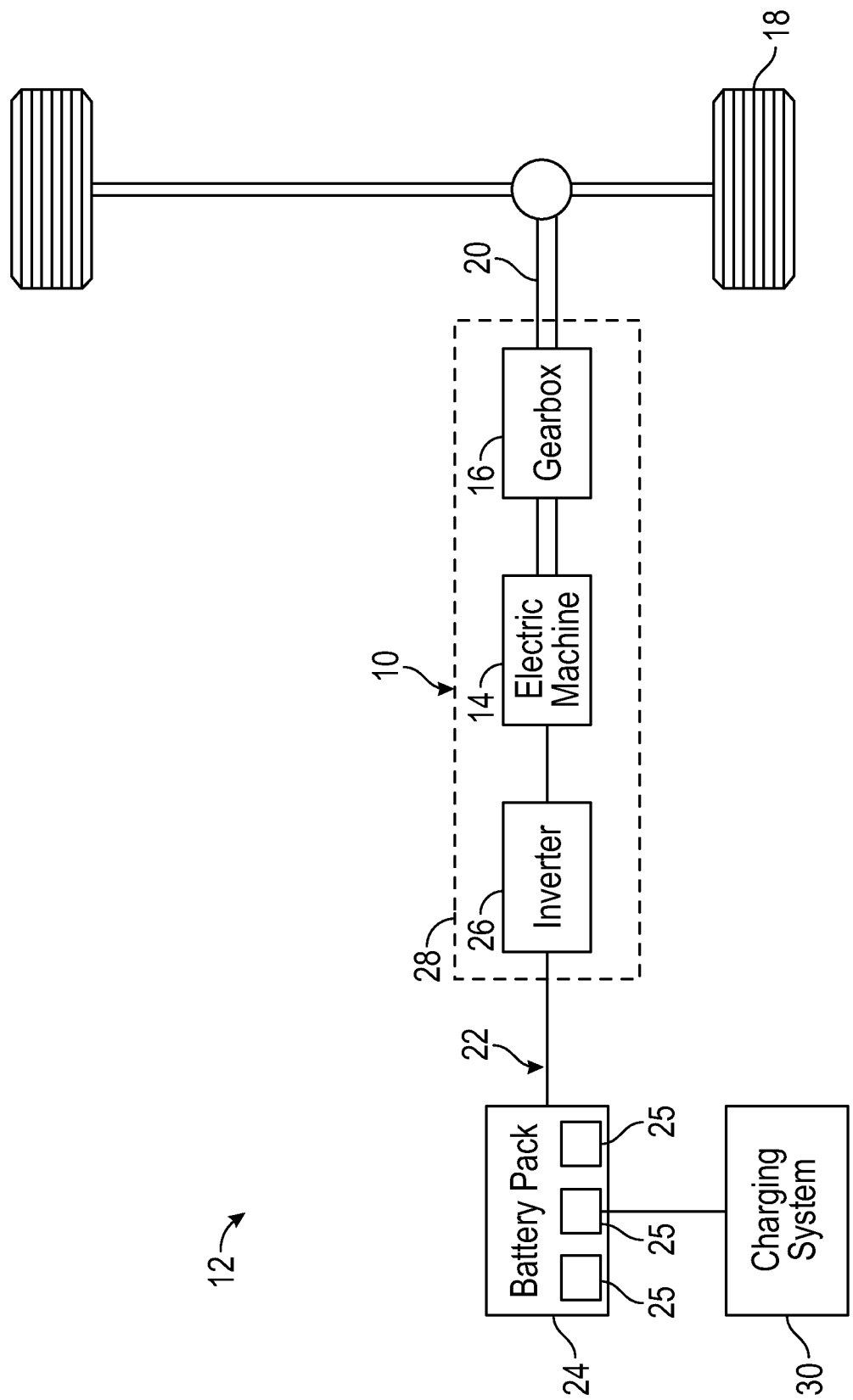
FIG. 1 schematically illustrates a powertrain of an electrified vehicle.

FIG. 1 schematically illustrates a powertrain 10 of an electrified vehicle 12. In an embodiment, the electrified vehicle 12 is a battery electric vehicle (BEV). However, it should be understood that the concepts described herein are not limited to BEVs and could extend to other electrified vehicles, including, but not limited to, hybrid electric vehicles (HEVs), plug-in hybrid electric vehicles (PHEVs), fuel cell vehicles, etc. Although not shown in this exemplary embodiment, the electrified vehicle 12 could be equipped with an internal combustion engine that can be employed either alone or in combination with other energy sources to propel the electrified vehicle 12.

In the illustrated embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output torque. The electric machine 14 may be connected to a gearbox 16 for adjusting the output torque and speed of the electric machine 14 by a predetermined gear ratio. The gearbox 16 is connected to a set of drive wheels 18 by an output shaft 20. A voltage bus 22 electrically connects the electric machine 14 to a battery pack 24 through an inverter 26, which can also be referred to as an inverter system controller (ISC). The electric machine 14, the gearbox 16, and the inverter 26 may be collectively referred to as a transmission 28 of the electrified vehicle 12.

The battery pack 24 is an exemplary electrified vehicle battery. The battery pack 24 may be a high voltage traction battery pack that includes a plurality of battery arrays 25 (i.e., battery assemblies or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 may also be equipped with a charging system 30 for charging the energy storage devices (e.g., battery cells) of the battery pack 24. The charging system 30 may include charging components that are located both onboard the electrified vehicle 12 (e.g. vehicle inlet assembly, etc.) and external to the electrified vehicle 12 (e.g., electric vehicle supply equipment (EVSE), etc.). The charging system 30 can be connected to an external power source (e.g., a wall outlet, a charging station, etc.) for receiving and distributing power received from the external power source throughout the electrified vehicle 12.

The powertrain 10 depicted by FIG. 1 is highly schematic and is not intended to limit this disclosure. Various additional components could alternatively or additionally be employed by the powertrain 10 within the scope of this disclosure.

Figure 2:
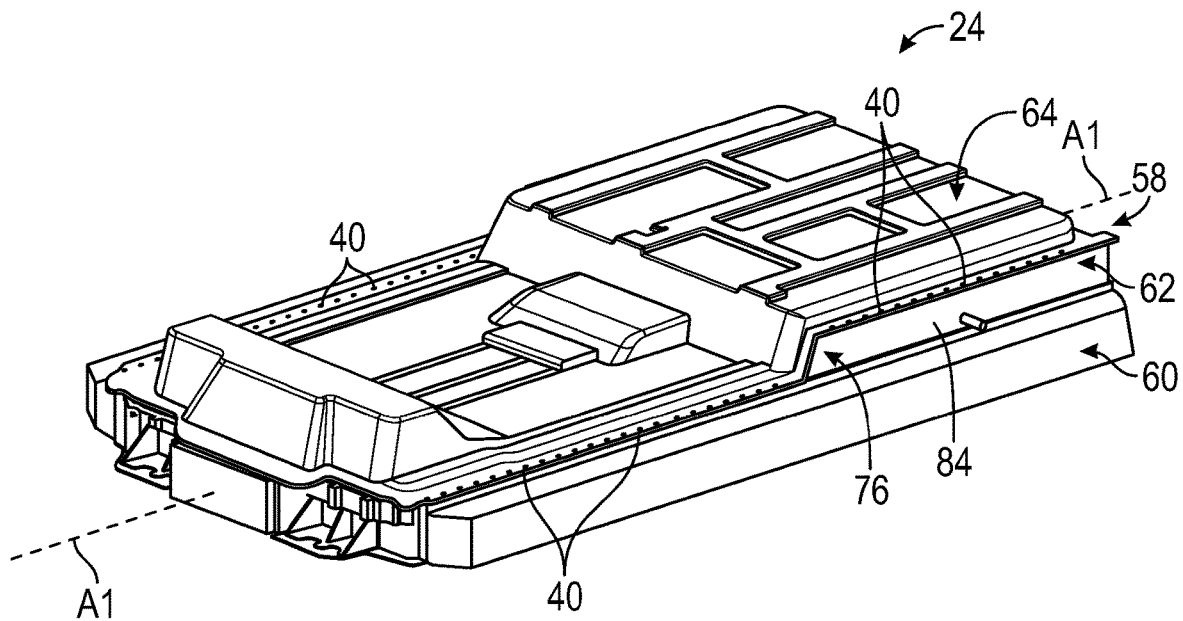
FIG. 2 illustrates a battery pack of an electrified vehicle.
Figure 3:
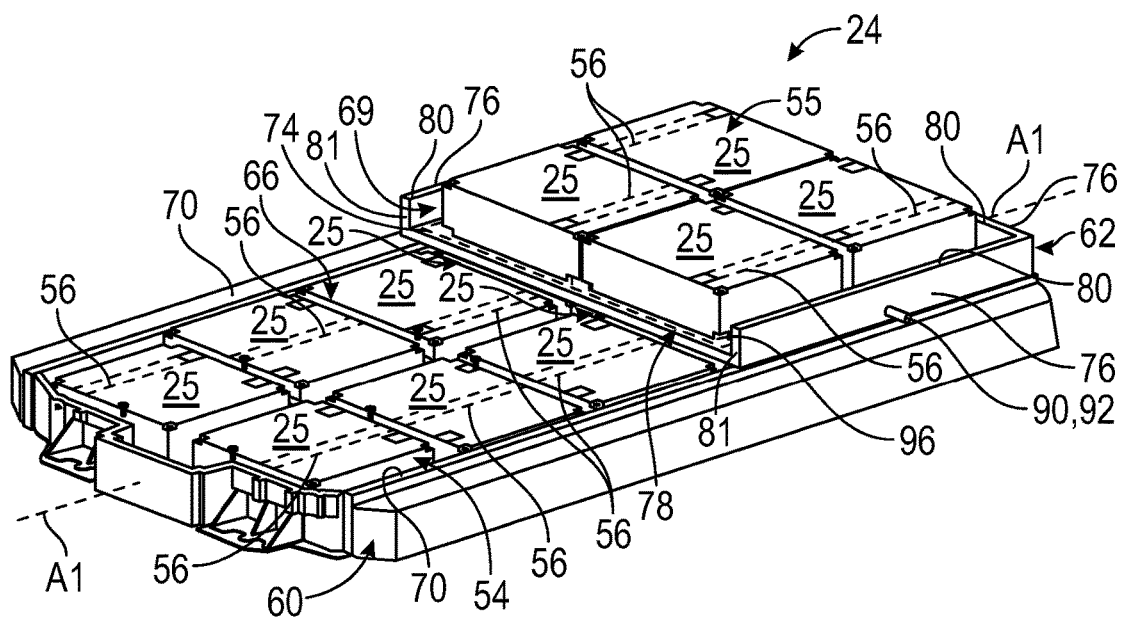
FIG. 3 is a perspective view of the battery pack of FIG. 2 with select portions removed in order to better illustrate an interior configuration of the battery pack.

FIGS. 2 and 3 illustrate a battery pack 24 that can be employed within an electrified vehicle, such as the electrified vehicle 12 of FIG. 1. Portions (e.g., a cover 64) of the battery pack 24 are removed in FIG. 3 in order to better visualize its internal contents and configuration.

The battery pack 24 may house a plurality of battery cells 56 that store energy for powering various electrical loads of the electrified vehicle 12. The battery pack 24 could employ any number of battery cells 56 within the scope of this disclosure. Accordingly, this disclosure should not be limited to the exact configuration shown in FIGS. 2-3.

The battery cells 56 may be stacked side-by-side along one or more stack axes to construct groupings of battery cells 56. In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 56 of each grouping, along with any support structures (e.g., array frames, spacers, rails, walls, plates, bindings, etc.), may collectively be referred to as a battery assembly or a battery array 25. The battery pack 24 depicted in FIG. 3 includes a first or lower tier 54 of adjacent battery arrays 25 and a second or upper tier 55 of adjacent battery arrays 25. The battery arrays 25 of the second tier may be positioned over top of at least a portion of the battery arrays 25 of the first tier 54.

The battery pack 24 illustrated in FIG. 3 includes a total of fourteen battery arrays 25. However, the battery pack 24 could include a greater or fewer number of battery arrays 25 and still fall within the scope of this disclosure. Therefore, this disclosure is not limited to the exact configuration shown in FIG. 3.

An enclosure assembly 58 houses the battery arrays 25 of both the first tier 54 and the second tier 55 of the battery pack 24. The enclosure assembly 58 may be disposed along a central longitudinal axis A1. In an embodiment, the enclosure assembly 58 is a multi-piece, sealed enclosure. The enclosure assembly 58 may include any size, shape, and configuration within the scope of this disclosure.

In an exemplary embodiment, the enclosure assembly 58 includes a tray 60, a mid-tray 62, and a cover 64. The tray 60, the mid-tray 62, and the cover 64 cooperate to position and enclose the battery arrays 25 of both the first tier 54 and the second tier 55 inside the battery pack 24.

The tray 60 may include an open area 66 for holding and supporting the battery arrays 25 of the first tier 54. The battery arrays 25 may be arranged in any configuration within the open area 66 of the tray 60.

The mid-tray 62 may be seated onto the tray 60 and includes an open arear 69 for receiving and supporting the battery arrays 25 of the second tier 55. The mid-tray 62 may be dimensionally smaller (e.g., shorter in a length direction that is parallel to the central longitudinal axis A1) than the tray 60 such that it covers only a portion of the battery arrays 25 of the first tier 54. The mid-tray 62 may engage three sides of the tray 60 when seated. In an embodiment, the mid-tray 62 is securely fastened to the tray 60 by fasteners 68 (see FIG. 7). The fasteners 68 could include screws, bolts, adhesives, etc., or any combinations thereof.

Figure 4:
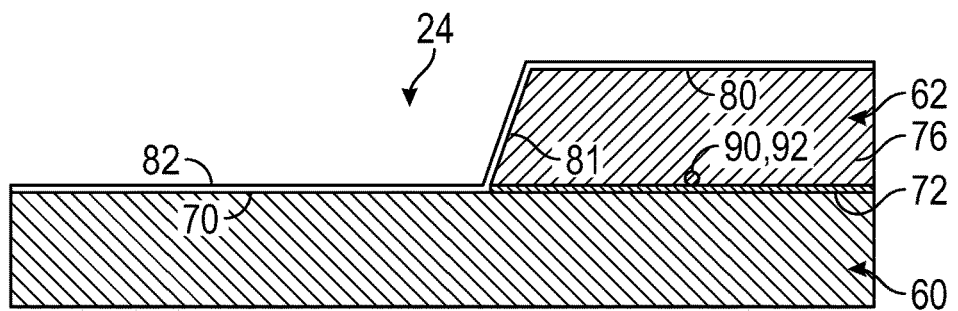
FIG. 4 is a side view of FIG. 3.
Figure 5:
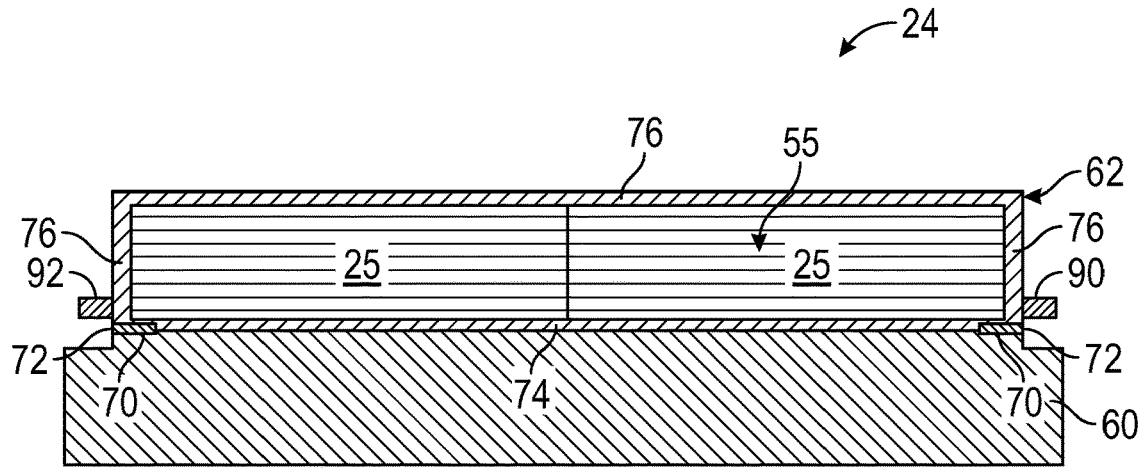
FIG. 5 is a front view of FIG. 3.

In another embodiment, the mid-tray 62 is positioned relative to a peripheral flange 70 of the tray 60. The peripheral flange 70 extends about a perimeter of the tray 60 and establishes a sealing surface for sealing between the tray 60 and the mid-tray 62. A seal 72 (see FIGS. 4-5), such as a liquid sealant or a gasket seal, may be applied/positioned between the peripheral flange 70 and the mid-tray 62 for blocking the ingress of moisture between the tray 60 and the mid-tray 62.

The mid-tray 62 may include a floor 74 and at least three side walls 76 that protrude upwardly from the floor 74. Two of the side walls 76 may longitudinally extend in parallel with the central longitudinal axis A1, and one of the side walls 76 may extend generally perpendicular to the central longitudinal axis A1 and connect between the two side walls 76 that longitudinally extend. In an embodiment, a fourth side of the mid-tray 62 is an open side 78 that allows for components, such as wiring harnesses of an electrical distribution system, to be easily routed between the first tier 54 and the second tier 55 of the battery pack 24.

Figure 6:
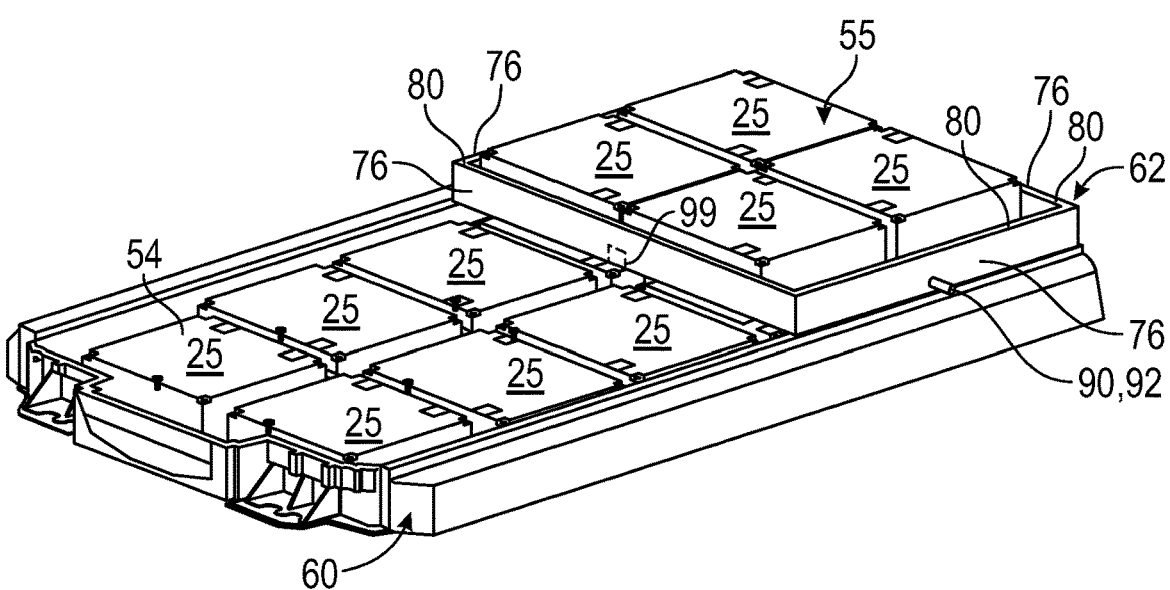
FIG. 6 illustrates an exemplary mid-tray of a battery pack.

In an another embodiment, the mid-tray 62 includes four side walls 76 that protrude upwardly from the floor 74 (see FIG. 6). In such an embodiment, components (e.g., wiring harnesses, etc.) may be routed between the first and second tiers 54, 55 through one or more openings 99 formed the floor 74, one or more of the side walls 76, or both (see FIG. 6).

The side walls 76 of the mid-tray 62 may each include a sealing surface 80. The open side 78 may additionally include sealing surfaces 81 that are established by ends of two of the side walls 76. The cover 64 may be positioned relative to the sealing surfaces 80, 81 of the mid-tray 62 and to the portions of the peripheral flange 70 of the tray 60 that are uncovered by the mid-tray 62 to enclose the battery arrays 25 inside the battery pack 24. Together, the sealing surfaces 80, 81 and the peripheral flange 70 establish a peripheral sealing surface for sealing between the cover 64 and each of the tray 60 and the mid-tray 62. A seal 82 (see FIG. 4), such as a liquid sealant or a gasket seal, may be applied between the sealing surfaces 80, 81 and the cover 64 and between the peripheral flange 70 and the cover 64 for blocking the ingress of moisture between the cover 64 and each of the tray 60 and the mid-tray 62.

In an embodiment, the cover 64 is securely fastened to the tray 60 and to the mid-tray by a plurality of fasteners 40 (see FIG. 2). The fasteners 68 could include screws, bolts, etc.

As shown in FIG. 2, portions of the mid-tray 62 may be exposed outside of the enclosure assembly 58 even after securing the cover 64 in place. In an embodiment, exterior surfaces 84 of side walls 76 of the mid-tray 62 are exposed outside of, and thus uncovered by, the cover 64. This allows coolant joints to be maintained outside of the battery pack 24 and therefore substantially eliminated inside of the battery pack 24, as further referenced below.

The enclosure assembly 58 of the battery pack 24 could have other configurations within the scope of this disclosure. For example, although illustrated as being substantially rectangular in FIG. 2, the enclosure assembly 58 could be triangular, round, irregular, etc.

The components of the enclosure assembly 58 may be made of metallic-based materials, polymer-based materials, or both. In an embodiment, the tray 60 and the mid-tray 62 are both constructed from a metallic material such as aluminum, and the cover 64 is constructed (e.g., molded) of a solid polymer-based material such as a sheet moulding compound (e.g., glass-fiber reinforced polyester), polypropylene, or polyamine. In another embodiment, the tray 60, the mid-tray 62, and the cover 64 are each constructed from a metallic material such as aluminum or steel. Other material configurations are further contemplated within the scope of this disclosure.

The battery arrays 25 of the second tier 55 may be supported atop the floor 74 of the mid-tray 62. In addition to supporting the battery arrays 25 of the second tier 55, the mid-tray 62 may include features for thermally managing the battery cells 56 of the battery arrays 25 of the second tier 55. For example, heat may be generated and released by the battery cells 56 of the battery arrays 25 during charging operations, discharging operations, extreme ambient conditions, or other conditions. It may be desirable to remove the heat from the battery arrays 25 to improve capacity, life span, and performance of the battery cells 56.

The mid-tray 62 may be configured to conduct the heat out of the battery cells 56 of the second tier 55. In other words, the mid-tray 62 may operate as a heat sink for removing heat from the heat sources (i.e., the battery cells 56). The mid-tray 62 could alternatively be employed to heat the battery cells 56, such as during extremely cold ambient conditions. Exemplary mid-tray designs for thermally managing the battery cells 56 of the battery arrays 25 of the second tier are further detailed below. Although not specifically shown, the battery arrays 25 of the first tier 54 could be thermally managed by one or more heat exchanger plates, sometimes referred to as cold plates or cold plate assemblies, arranged between the tray 60 and the battery arrays 25 of the first tier 54. Alternatively, the tray 60 could be configured to thermally manage the battery arrays 25 of the first tier 54.

Figure 7:
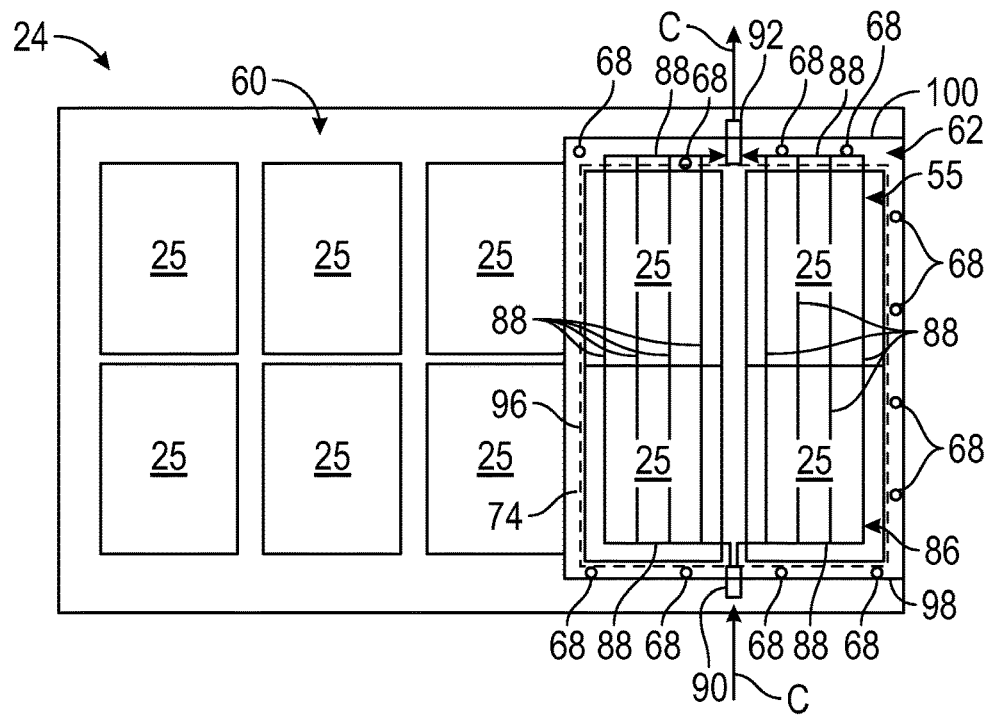
FIG. 7 illustrates an exemplary internal cooling circuit of a mid-tray of a battery pack.

FIG. 7 illustrates an exemplary internal cooling circuit 86 of the mid-tray 62. The internal cooling circuit 86 may be arranged inside the floor 74, inside portions of the side walls 76, and/or inside any other surface of the mid-tray 62 upon which the battery arrays 25 of the second tier 55 are positioned. In an embodiment, the mid-tray 62 is a cast component and the internal cooling circuit 86 is cast into the floor 74. In another embodiment, the internal cooling circuit 86 is an extrusion assembled prior to casting the mid-tray 62 and then overmolded into the casting.

The internal cooling circuit 86 may be part of a liquid cooling system that is configured for circulating a coolant C, such as water mixed with ethylene glycol or any other coolant, through the mid-tray 62. The internal cooling circuit 86 may include a plurality of fluid passes 88 that connect between an inlet port 90 and an outlet port 92. In a first embodiment, the fluid passes 88 are arranged in a substantially linear configuration and extend underneath the battery arrays 25 of the second tier 55 (see FIG. 7). In a second embodiment, the fluid passes 88 are arranged to establish a serpentine path 94 that is disposed beneath the battery arrays 25 of the second tier 55 (see FIG. 8).

Figure 8:
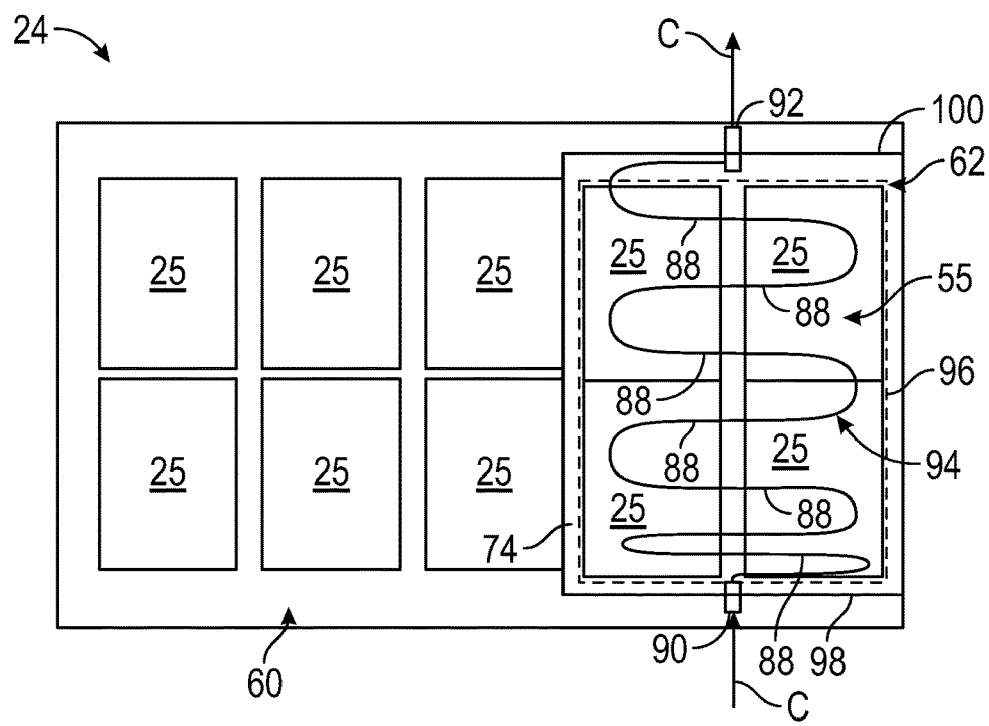
FIG. 8 illustrates another exemplary internal cooling circuit of a mid-tray of a battery pack.

FIGS. 7-8 illustrate two exemplary internal cooling circuit configurations. However, the internal cooling circuit 86 of the mid-tray 62 could include various other configurations within the scope of this disclosure. For example, the various fluid passes 88 of the internal cooling circuit 86 can be configured in different sizes, shapes, and paths to help meter and balance the flow of the coolant C through the internal cooling circuit 86. The size and shape of each fluid pass 88 and the total number of fluid passes 88 are not intended to limit this disclosure and can be specifically tuned to the cooling requirements of the battery pack 24.

In use, the coolant C may be communicated into the inlet port 90 and then through the fluid passes 88 that define the internal cooling circuit 86 before exiting through the outlet port 92. The coolant C picks up the heat conducted through the floor 74 of the mid-tray 62 from the battery cells 56 as it meanders through the internal cooling circuit 86. Although not shown, the coolant C exiting the outlet port 92 may be delivered to a radiator or some other heat exchanging device, be cooled, and then be returned to the inlet port 90 in a closed loop.

A thermal interface material (TIM) 96 (schematically shown in FIGS. 3, 7, and 8) may optionally be positioned between the battery arrays 25 of the second tier 55 and the floor 74 of the mid-tray 62 such that exposed surfaces of the battery cells 56 of the battery arrays 25 are in direct contact with the TIM 96. The TIM 96 maintains thermal contact between the battery cells 56 of the second tier 55 and the floor 74, thereby increasing the thermal conductivity between these neighboring components during heat transfer events. The TIM 96 may be made of any known thermally conductive material. In an embodiment, the TIM 96 includes an epoxy resin. In another embodiment, the TIM 96 includes a silicone based material. Other materials, including but not limited to thermal greases, may alternatively or additionally make up the TIM 96.

Figure 9A:
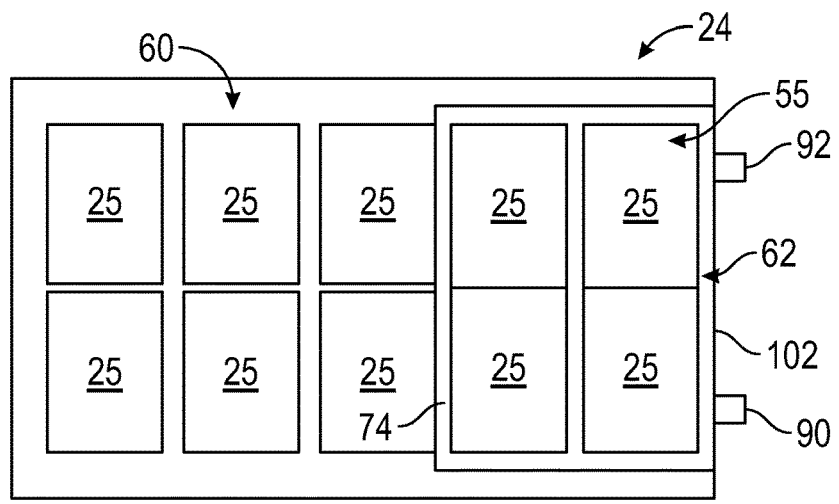
FIGS. 9A, 9B, and 9C illustrate exemplary coolant port locations for a mid-tray of a battery pack.
Figure 9B:
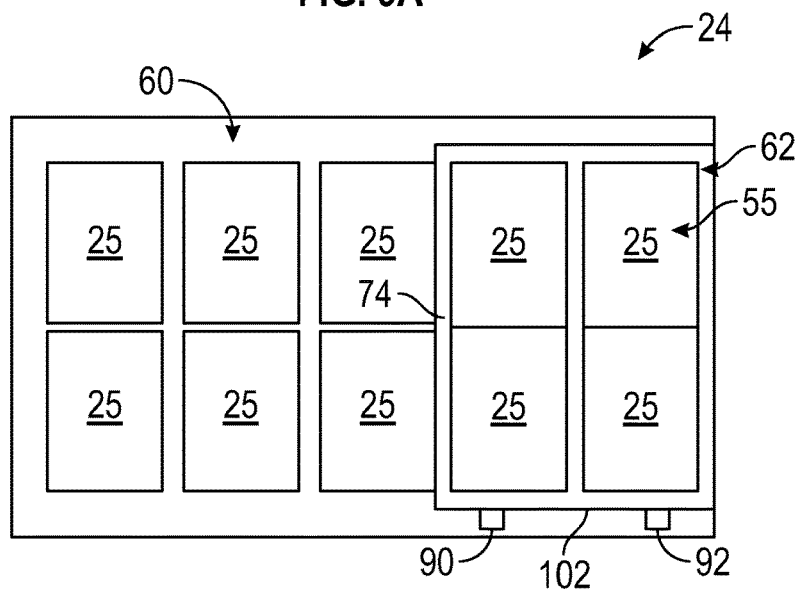
Figure 9C:
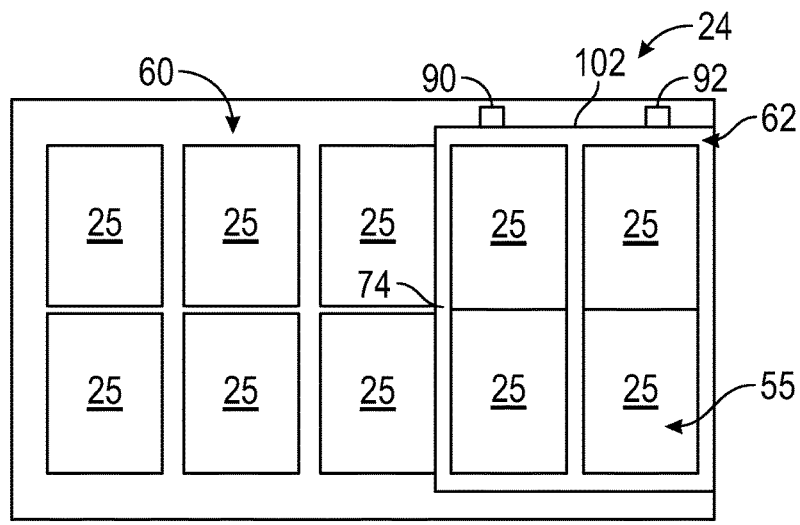

The inlet port 90 and the outlet port 92 may protrude outwardly from exterior surfaces of the mid-tray 62. In an embodiment, the inlet port 90 extends outwardly from a first external side 98 of the floor 74 and the outlet port 92 extends outwardly from a second, opposing external side 100 of the floor 74 (see, e.g., FIGS. 7 and 8). In other embodiments, the inlet port 90 and the outlet port 92 are provided on a common external side 102 of the floor 74 (see, e.g., FIGS. 9A, 9B, and 9C). In still other embodiments, the inlet port 90 and the outlet port 92 extend outwardly from opposing side walls 76 of the mid-tray 62 (see, e.g., FIG. 3). Accordingly, it should be appreciated that the exact mounting locations for the inlet port 90 and the outlet port 92 are not intended to limit this disclosure.

The inlet port 90 and the outlet port 92 are uncovered by the cover 64 or any other portion of the enclosure assembly 58. The inlet port 90 and outlet port 92 are therefore exposed outside of the battery pack 24 and are readily accessible. Positioning the inlet port 90 and the outlet port 92 in this manner substantially eliminates the need for providing coolant joints inside the battery pack 24.

The exemplary battery packs of this disclosure incorporate a mid-tray that functions as an integrated supporting, sealing, and thermal structure for second tier battery arrays. Integrating the supporting, sealing, and thermal features into a single mid-tray structure allows the second tier coolant ports to be located outside of the battery pack, thereby obviating the need for more expensive and complex pack designs. The proposed designs also eliminate the need for providing individual, non-structural cold plates for each second tier array.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
   a tray;
   a first battery array positioned within the tray;
   a mid-tray received relative to the tray;
   a second battery array positioned within the mid-tray; and
   an internal cooling circuit disposed inside a floor of the mid-tray and configured to thermally manage the second battery array.

2. The battery pack as recited in claim 1, wherein the tray includes a peripheral flange, and the mid-tray is secured to the peripheral flange by a fastener.

3. The battery pack as recited in claim 2, comprising a seal disposed between the peripheral flange and the mid-tray.

4. The battery pack as recited in claim 1, comprising:
   a third battery array spaced apart from the first battery array within the tray; and
   a fourth battery array spaced apart from the second battery array within the mid-tray.

5. The battery pack as recited in claim 1, wherein the mid-tray includes the floor and at least three side walls that protrude upwardly from the floor.

6. The battery pack as recited in claim 5, wherein the mid-tray includes an open side.

7. The battery pack as recited in claim 1, comprising a thermal interface material (TIM) disposed between the second battery array and the mid-tray.

8. The battery pack as recited in claim 1, wherein the internal cooling circuit includes a plurality of fluid passes arranged between an inlet port and an outlet port of the mid-tray.

9. The battery pack as recited in claim 8, wherein the inlet port and the outlet port protrude outwardly from an external surface of a wall of the mid-tray.

10. The battery pack as recited in claim 8, wherein the plurality of fluid passes are arranged together to establish a serpentine path.

11. The battery pack as recited in claim 1, comprising a cover secured over both the tray and the mid-tray such at least a portion of both the tray and the mid-tray are exposed outside of the cover.

12. A battery pack, comprising:
   a tray;
   a first tier of battery arrays supported by the tray;
   a mid-tray positioned over at least a portion of the first tier of battery arrays and secured to a peripheral flange of the tray;
   a second tier of battery arrays supported by the mid-tray; and
   a cover secured to both the peripheral flange of the tray and a sealing surface of the mid-tray, wherein the mid-tray includes a floor and an internal cooling circuit disposed inside the floor.

13. The battery pack as recited in claim 12, wherein the mid-tray includes the floor and at least three side walls that protrude upwardly from the floor.

14. The battery pack as recited in claim 13, wherein the internal cooling circuit includes a plurality of fluid passes disposed inside of the floor.

15. The battery pack as recited in claim 12, comprising a first seal disposed between the peripheral flange and the mid-tray and a second seal disposed between the cover and the peripheral flange and between the cover and the mid-tray.

16. The battery pack as recited in claim 12, wherein the mid-tray includes an inlet port and an outlet port that are both exposed outside of the battery pack.

17. The battery pack as recited in claim 16, wherein the internal cooling circuit of the mid-tray connects between the inlet port and the outlet port.

18. The battery pack as recited in claim 12, wherein the mid-tray is secured to the tray by a first plurality of fasteners and the cover is secured to both the tray and the mid-tray by a second plurality of fasteners.

19. The battery pack as recited in claim 12, wherein the battery pack excludes any internal coolant joints.

\* \* \* \* \*